United States Patent
Vess

(10) Patent No.: US 8,502,121 B2
(45) Date of Patent: Aug. 6, 2013

(54) RADIOFREQUENCY WELDING APPARATUS

(75) Inventor: Mark A. Vess, Hanson, MA (US)

(73) Assignee: Covidien LP, Mansfield, MA (US)

( * ) Notice: Subject to any disclaimer, the term of this patent is extended or adjusted under 35 U.S.C. 154(b) by 1085 days.

(21) Appl. No.: 12/486,533

(22) Filed: Jun. 17, 2009

(65) Prior Publication Data

US 2010/0320193 A1 Dec. 23, 2010

(51) Int. Cl.
 *B23K 13/01* (2006.01)
(52) U.S. Cl.
 USPC .......................... 219/617; 219/765
(58) Field of Classification Search
 USPC ............... 156/272.2, 367, 378, 380.3, 379.6, 156/380.2; 219/765, 617; 333/32
 See application file for complete search history.

(56) References Cited

U.S. PATENT DOCUMENTS

| | | | |
|---|---|---|---|
| 2,422,525 A | 6/1947 | Brown et al. |
| 2,764,862 A | 10/1956 | Rado |
| 2,816,596 A | 12/1957 | Welch, Jr. |
| 2,941,575 A | 6/1960 | Malmberg et al. |
| 3,454,442 A | 7/1969 | Heller, Jr. |
| 3,574,031 A | 4/1971 | Heller, Jr. et al. |
| 3,583,458 A | 6/1971 | Costa |
| 3,783,217 A | 1/1974 | Brown |
| 3,945,867 A | 3/1976 | Heller, Jr. et al. |
| 4,023,607 A | 5/1977 | Jensen et al. |
| 4,091,804 A | 5/1978 | Hasty |
| 4,126,167 A | 11/1978 | Smith et al. |
| 4,352,669 A | 10/1982 | Norton |
| 4,384,186 A | 5/1983 | Burt |
| 4,390,832 A | 6/1983 | Taylor |
| 4,417,122 A | 11/1983 | Thorne |
| 4,417,753 A | 11/1983 | Bacehowski et al. |
| 4,425,177 A | 1/1984 | Shinno |
| 4,453,538 A | 6/1984 | Whitney |
| 4,465,487 A | 8/1984 | Nakamura et al. |
| 4,484,904 A | 11/1984 | Fowler |
| 4,496,095 A | 1/1985 | Renshaw et al. |
| 4,549,684 A | 10/1985 | Telly et al. |
| 4,600,613 A | 7/1986 | Yoshida |
| 4,650,452 A | 3/1987 | Jensen |
| 4,809,684 A | 3/1989 | Gardner et al. |
| 4,836,691 A | 6/1989 | Suzuki et al. |
| 4,876,788 A | 10/1989 | Steer et al. |

(Continued)

FOREIGN PATENT DOCUMENTS

| | | |
|---|---|---|
| DE | 10 2006 004 611 A1 | 8/2007 |
| EP | 0 200 483 A2 | 11/1986 |

(Continued)

OTHER PUBLICATIONS

Yousefpour, "Fusion Bonding/Welding of Thermoplastic Composites", Journal of Thermoplastic Composite Materials, vol. 17, No. 4, Jan. 1, 2004, pp. 303-341.

(Continued)

*Primary Examiner* — Henry Yuen
*Assistant Examiner* — Thien S Tran
(74) *Attorney, Agent, or Firm* — John Paul Mello, Esq.

(57) ABSTRACT

Apparatus and methods for radiofrequency (RF) welding are disclosed. RF power delivered to a welding platen of the apparatus is capacitively split into first and second RF power components of different magnitudes. The power components are simultaneously delivered to respective first and second die members to conduct an RF welding operation.

13 Claims, 12 Drawing Sheets

U.S. PATENT DOCUMENTS

| | | | |
|---|---|---|---|
| 4,892,604 A | | 1/1990 | Measells et al. |
| 4,941,936 A | * | 7/1990 | Wilkinson et al. ......... 156/274.8 |
| 4,950,347 A | | 8/1990 | Futagawa |
| 4,979,953 A | | 12/1990 | Spence |
| 5,047,605 A | | 9/1991 | Ogden |
| 5,278,382 A | | 1/1994 | Rische et al. |
| 5,324,233 A | | 6/1994 | Owensby et al. |
| 5,336,123 A | | 8/1994 | Laske et al. |
| 5,349,166 A | | 9/1994 | Taylor |
| 5,354,260 A | | 10/1994 | Cook |
| 5,427,645 A | * | 6/1995 | Lovin ......................... 156/367 |
| 5,437,595 A | | 8/1995 | Smith |
| 5,507,904 A | | 4/1996 | Fisher et al. |
| 5,591,337 A | | 1/1997 | Lynn et al. |
| 5,678,732 A | | 10/1997 | Gianpaolo |
| 5,769,801 A | | 6/1998 | Tumey et al. |
| 5,803,888 A | | 9/1998 | Severs et al. |
| 5,840,049 A | | 11/1998 | Tumey et al. |
| 5,976,300 A | | 11/1999 | Buchanan et al. |
| 5,989,204 A | | 11/1999 | Lina |
| 6,001,119 A | | 12/1999 | Hampson et al. |
| 6,011,235 A | | 1/2000 | Mukai et al. |
| 6,036,718 A | | 3/2000 | Ledford et al. |
| 6,127,009 A | | 10/2000 | Strassmann |
| 6,213,334 B1 | * | 4/2001 | Coelho et al. ................ 220/501 |
| 6,259,059 B1 | | 7/2001 | Hsu |
| 6,486,456 B1 | | 11/2002 | Moro et al. |
| 6,601,710 B2 | | 8/2003 | Calhoun et al. |
| 6,652,942 B2 | | 11/2003 | Ling et al. |
| 6,828,536 B1 | | 12/2004 | Grimes et al. |
| 7,012,232 B1 | | 3/2006 | Gruenspecht et al. |
| 7,041,936 B2 | | 5/2006 | Oberzaucher et al. |
| 7,237,290 B2 | | 7/2007 | Bichler |
| 7,353,946 B2 | | 4/2008 | Cervantes |
| 7,399,375 B2 | | 7/2008 | Leiser et al. |
| 8,151,851 B2 | | 4/2012 | Vess |
| 2004/0026391 A1 | | 2/2004 | Oberzaucher et al. |
| 2004/0054306 A1 | | 3/2004 | Roth et al. |
| 2004/0133135 A1 | | 7/2004 | Diana |
| 2004/0199090 A1 | | 10/2004 | Sanders et al. |
| 2007/0038167 A1 | | 2/2007 | Tabron et al. |
| 2007/0045240 A1 | | 3/2007 | Smith et al. |
| 2007/0135835 A1 | | 6/2007 | McEwen et al. |
| 2008/0041847 A1 | | 2/2008 | Gruenspecht et al. |
| 2008/0149609 A1 | | 6/2008 | Vess |
| 2008/0249447 A1 | | 10/2008 | Brown et al. |
| 2008/0269658 A1 | | 10/2008 | Vinton et al. |
| 2009/0069731 A1 | | 3/2009 | Parish et al. |
| 2010/0004575 A1 | | 1/2010 | Vess |

FOREIGN PATENT DOCUMENTS

| | | |
|---|---|---|
| EP | 0 221 636 A1 | 5/1987 |
| EP | 0 339 494 A2 | 11/1989 |
| EP | 0 344 949 A2 | 12/1989 |
| EP | 1 795 168 B1 | 6/2007 |
| EP | 1 935 616 A2 | 6/2008 |
| EP | 2 168 555 A1 | 3/2010 |
| FR | 914433 | 10/1946 |
| GB | 2 193 485 A | 2/1988 |
| JP | 08-038580 | 2/1996 |
| JP | 8025227 B | 3/1996 |
| WO | 98/09872 | 3/1998 |

OTHER PUBLICATIONS

Extended European Search Report dated May 16, 2012 regarding European Application No. 10166304.5, 7 pages.

* cited by examiner

RADIOFREQUENCY WELDING APPARATUS

FIELD OF THE INVENTION

The present invention generally relates to welding apparatus and, more particularly, to radiofrequency (RF) welding.

BACKGROUND OF THE INVENTION

Welding by radiofrequency energy is an efficient and fast way to manufacture certain products. For example, radio frequency energy may be used to weld certain polymeric materials, such as polyvinyl chloride (PVC) and polyurethane, to make flexible bags for retaining fluid. For example, a bag or bladder for receiving pressurized air is incorporated into a vascular compression device for preventing pulmonary embolisms and deep vein thrombosis (DVT).

A bladder of a typical vascular compression device includes a pair of opposing polymeric sheets welded around their perimeters and a polymeric tube port welded between the sheets in fluid communication with the bladder. An exemplary process for forming the bladder uses a bladder die for welding the bladder together and a cylindrical mandrel for welding the polymeric sheets to the tube. At a first weld station, the cylindrical mandrel is inserted into the tube, and the mandrel and the tube are placed between the opposing sheets. A tube die is lowered to compress the tube and the mandrel between the sheets. Radiofrequency current is supplied to the mandrel to create a radiofrequency electric field between the mandrel and the die. The electric field heats the polymeric sheets and the tube, thereby welding the sheets to the tube. After the sheets are welded to the tube, the mandrel is removed from the tube and the subassembly is moved to a second welding station for forming the perimeter of the bladder. The subassembly is compressed between two opposing die members and radiofrequency current is directed to the die members to form a perimeter-weld.

The above process is inefficient and time-consuming for a number of reasons, including the fact that two distinct welding operations are required to form the bladder.

There is a need, therefore, for a more efficient RF welding process to form products, including but not limited to bags or bladders of the type described above.

SUMMARY OF THE INVENTION

In general, this invention is directed to a radiofrequency welding apparatus. The apparatus comprises a first welding platen and a second welding platen. The apparatus also comprises a single source providing radiofrequency power to the first welding platen. A first die member is mounted on the first welding platen, and a second die member is mounted on the first welding platen adjacent to the first die member, the first and second die member being electrically isolated. The apparatus also comprises a radiofrequency power distributing device for capacitively splitting the radiofrequency power provided to said welding platen into first and second radiofrequency power components of different magnitudes and for simultaneously delivering the RF power components to the first and second die members, respectively.

This invention is further directed to a method of radiofrequency welding. The method includes providing radiofrequency power from a single radiofrequency source to a welding platen carrying first and second die members electrically isolated from each other. The method also includes capacitively splitting the radiofrequency power provided to the welding platen into first and second radiofrequency power components of different magnitudes. The method further comprises simultaneously delivering the first radiofrequency power component to the first die member and the second radiofrequency power component to the second die member, and using the first and second die members to simultaneously apply the first and second radiofrequency power components to a plurality of work pieces to weld the work pieces together simultaneously.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
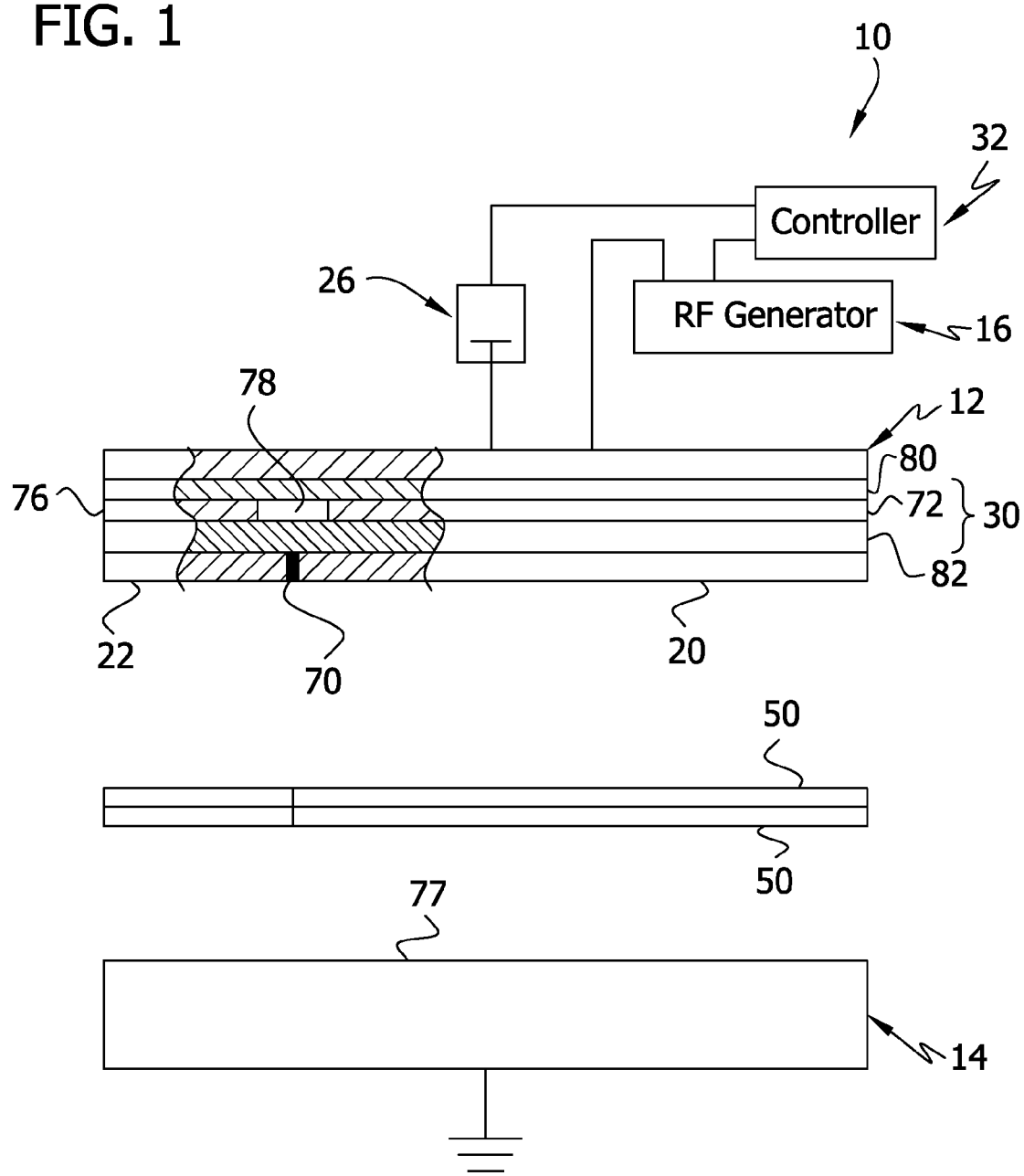
FIG. 1 is a schematic view of a radiofrequency welding apparatus of this invention, including opposing first and second welding platens.

Referring to FIG. 1, an RF welding apparatus of the present invention is designated in its entirety by the reference number 10. In general, the apparatus 10 comprises opposing first and second welding platens designated 12 and 14, respectively, and a single source comprising an RF generator 16 for providing RF power to the first welding platen 12. First and second die members designated 20 and 22, respectively are mounted on the first welding platen 12. As illustrated, the first welding platen 12 is an upper welding platen and the second welding platen 14 is a lower welding platen, but this arrangement can be reversed. The welding platens 12, 14 are movable toward and away from one another by a press device 26 to effect an RF welding operation in a manner to be described hereinafter. The apparatus 10 further comprises an RF power distributing device, generally designated 30, for capacitively splitting the RF power provided to the first welding platen 12 into first and second RF power components of different magnitudes and for simultaneously delivering these power components to the first and second die members 20, 22, respectively, during the welding operation. The welding apparatus 10 also includes a microcontroller 32 for integrating control of the press device 26 and the radiofrequency generator 16.

Figure 3:
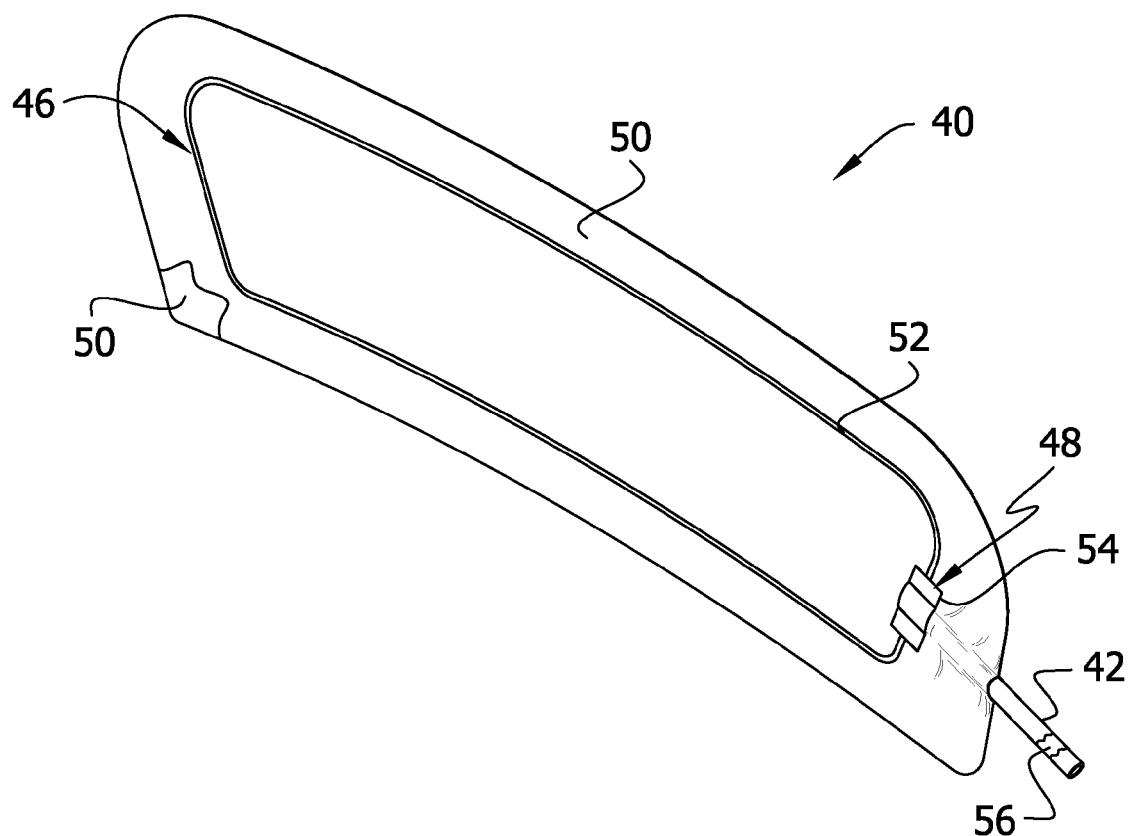
FIG. 3 is a perspective view of a bladder assembly made using the apparatus of FIG. 1.

For purposes of illustration, the RF welding apparatus 10 is described herein as welding the components of a bladder assembly (broadly, "bag assembly") generally indicated at 40 in FIG. 3. The bladder assembly 40 is constructed for use with a vascular compression device. The assembly 40 includes a tube 42 in fluid communication with an interior of a bladder 46 at a tube port, generally indicated at 48. Opposed sheets 50 are welded together along a perimeter-weld 52 to define the bladder 46 and along a tube-weld 54 to define the tube port 48. It will be understood that the bladder assembly 40 can have other configurations (e.g., multiple bladders and/or multiple tubes per bladder). The apparatus 10 can be used to form other types of products within the scope of the present invention.

Figure 2:
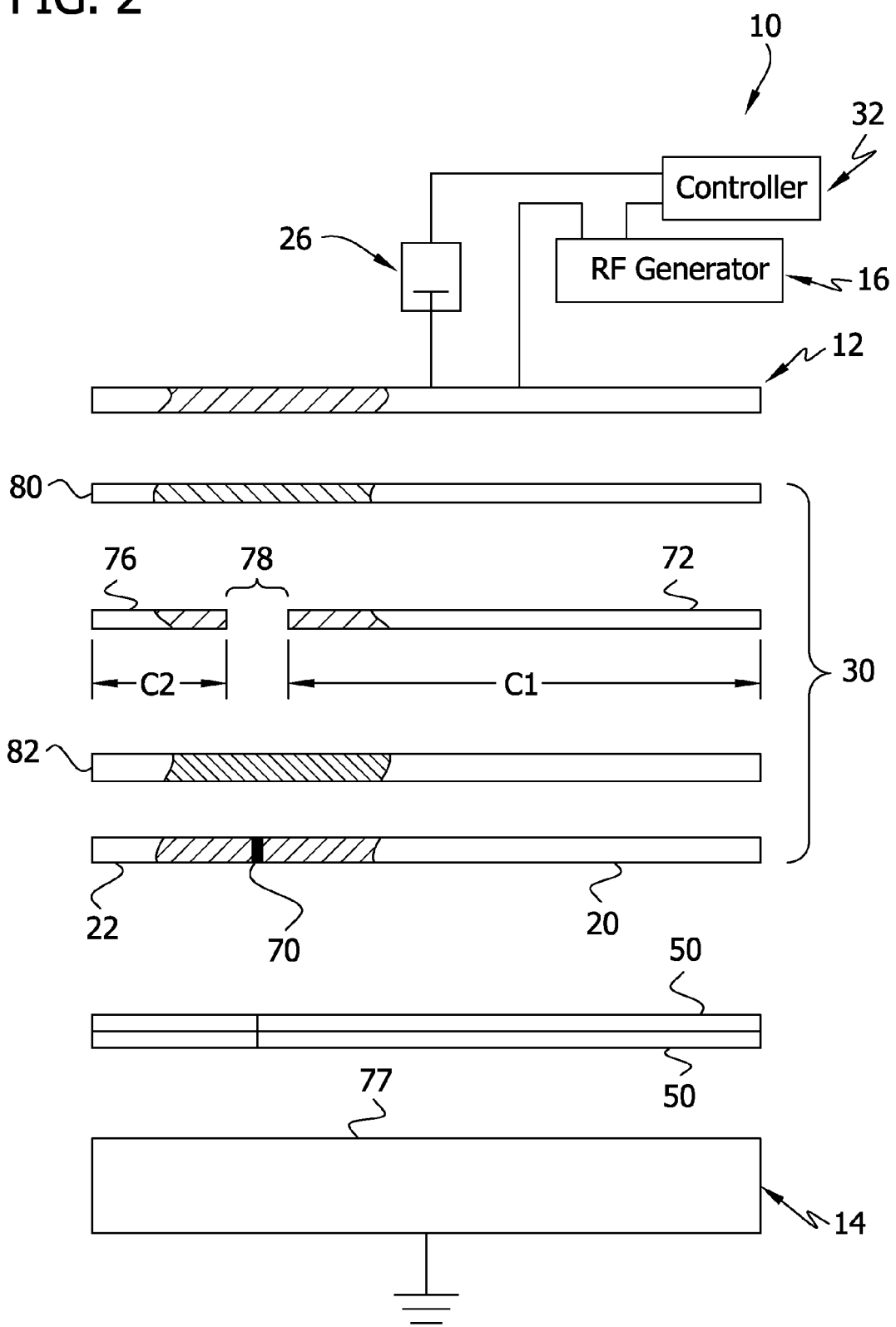
FIG. 2 is an exploded view of component parts of the apparatus of FIG. 1.

In the illustrated embodiments of FIGS. 1-3, the upper welding platen 12 comprises a metal plate (also designated by the reference number 12) movable up and down by the press device 26, and the lower welding platen 14 comprises a stationary metal plate (also designated by the reference number 14) opposing the first metal plate. The upper platen 12 is electrically connected to the RF generator 16 and the lower platen 14 is electrically grounded to create a radiofrequency field between the platens. The arrangement is such that, during a welding operation, the sheets 50 are heated by RF-induced oscillations to form the perimeter-weld 52, and the sheets and tube 42 are heated to form the tube-weld 54.

As used herein, the term "bladder subassembly" refers broadly to the sheets 50 and the tube 42 disposed between the sheets 50 before the sheets 50 and the tube 42 have been welded. Other components may be included in the subassembly and some components may be already connected together within the scope of the present invention. By way of example, the bladder subassembly may include a tubular insert 56 inserted in the polymeric tube 50. The tubular insert 56 may be formed from a non-ferrous metal, such as brass or copper or aluminum or stainless steel, or may be formed from other material. The insert 56 is sized and shaped to fit snugly within the axial portion of the tube 42 that is to be welded to the sheets 50. For additional detail regarding the insert, reference may be made to co-assigned pending U.S. application Ser. No. 11/613,694, filed Dec. 20, 2006, Pub. No. US 2008/0149609, titled APPARATUS AND METHOD FOR MAKING BAG ASSEMBLY, and in co-assigned pending U.S. application Ser. No. 12/486,467, filed Jun. 17, 2009, titled APPARATUS FOR MAKING BAG ASSEMBLY AND METHOD THEREOF, both of which applications are incorporated by reference herein.

Figure 4:
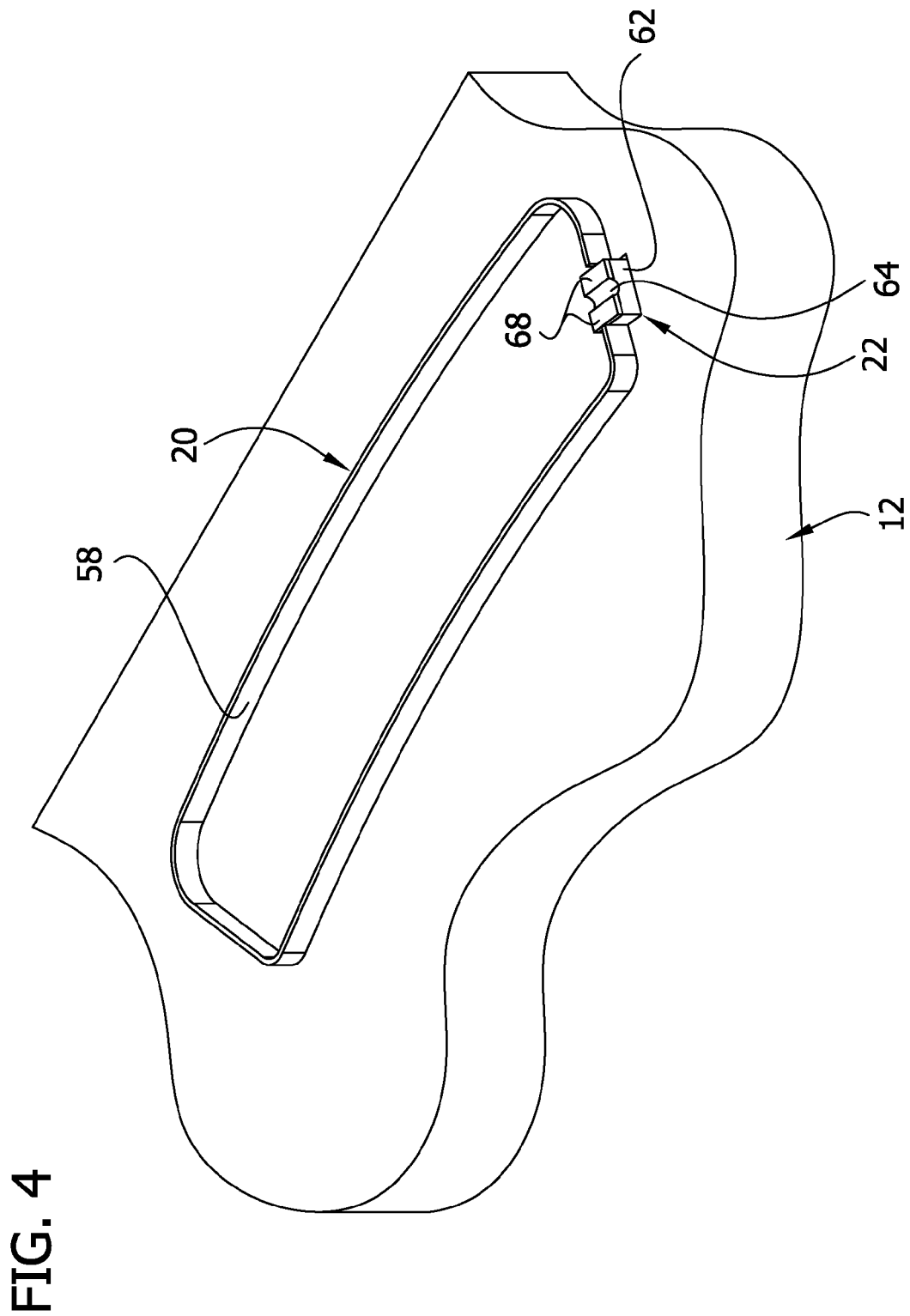
FIG. 4 is a perspective view of first and second die members on the first welding platen of the apparatus of FIG. 1.
Figure 5:
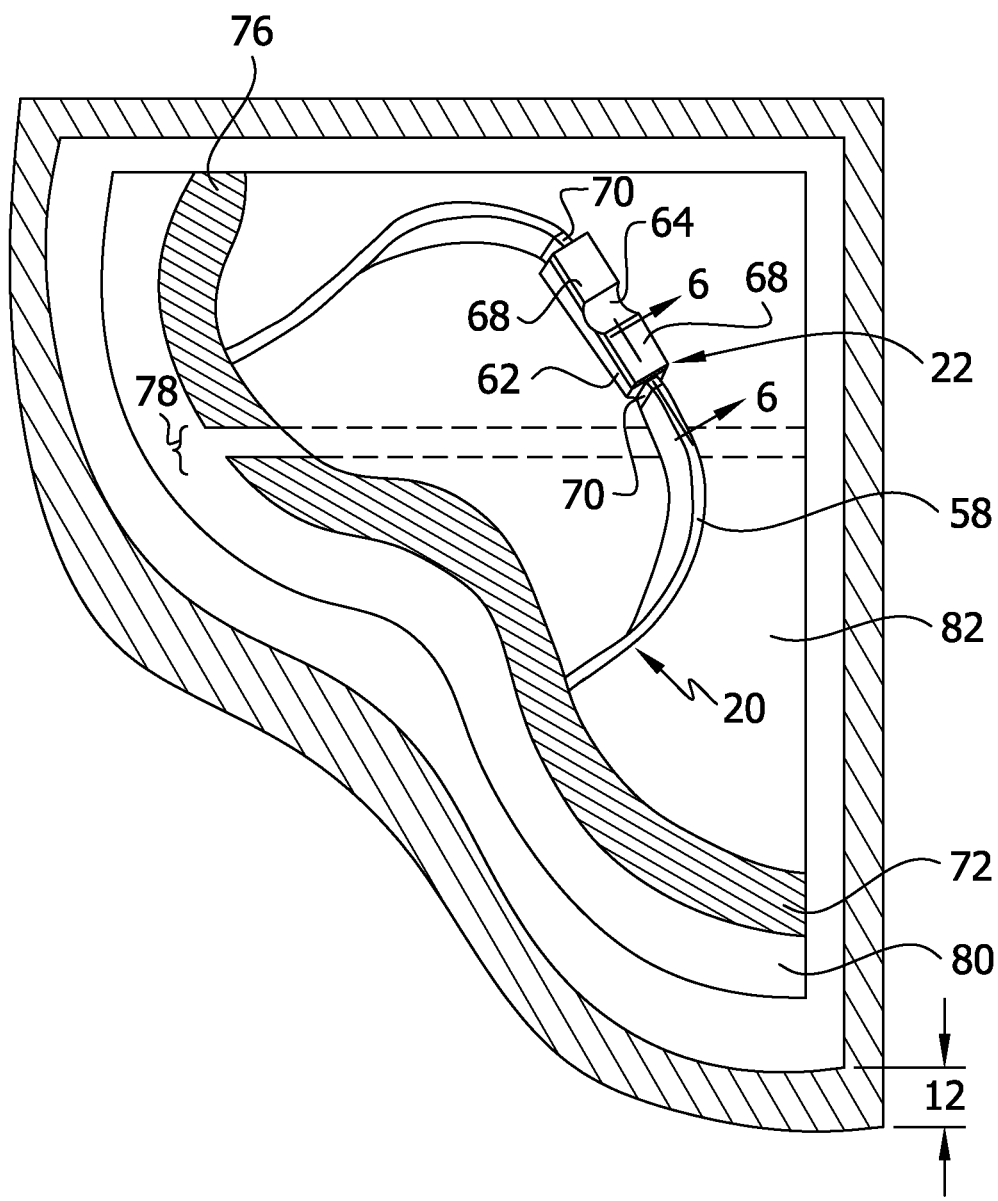
FIG. 5 is a schematic view of portions of the first and second die members and various elements of a radiofrequency power distributing device on the first welding platen.
Figure 6:
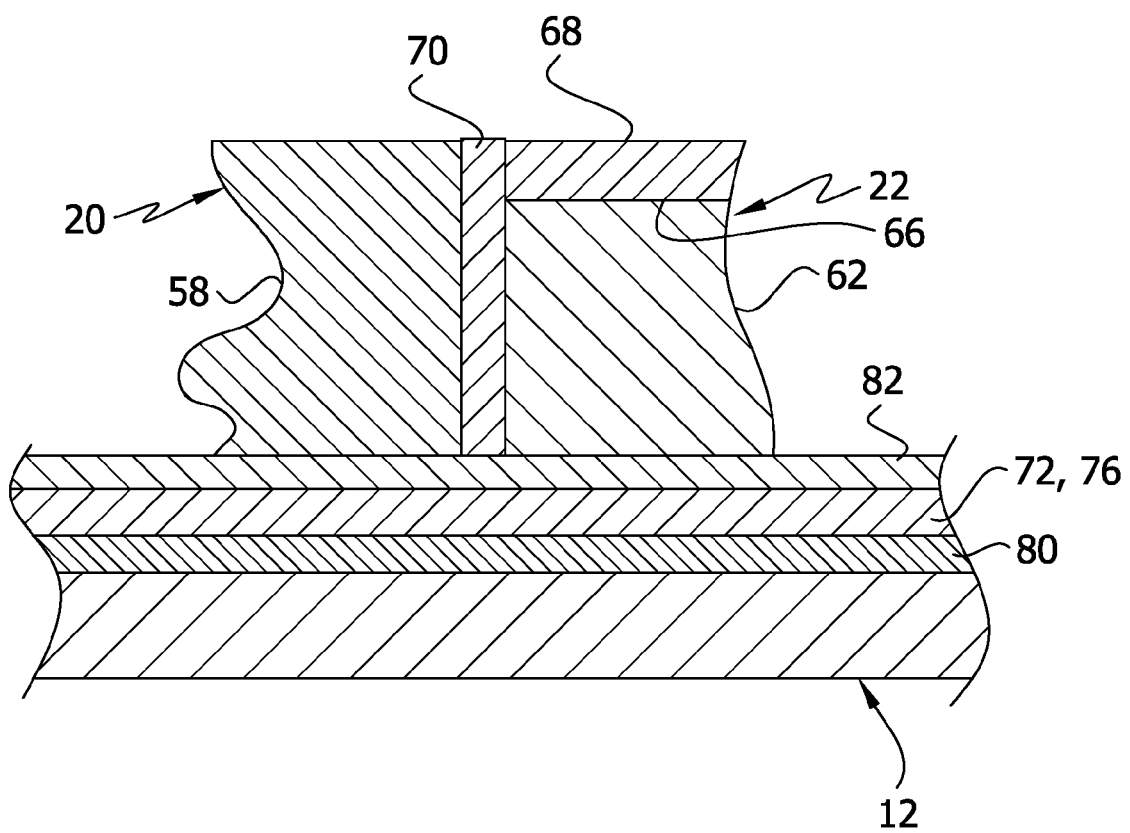
FIG. 6 is an enlarged section taken in the plane of 6-6 of FIG. 5.

Referring to FIGS. 4-6, the first die member 20 on the upper welding platen 12 comprises a perimeter-welding electrode 58 in the form of a ribbon electrode, also designated by reference number 58. The ribbon electrode 58 projects down toward the lower welding platen 14 (see FIG. 1) and has the shape of the perimeter-weld 52 to be formed. The second die member 22 on the upper welding platen 12 comprises a tube-welding electrode 62 in the form of a tube-welding block (also designated by reference number 62) positioned between adjacent opposite ends of the ribbon electrode 58. The tube-welding electrode 62 is configured to form the tube-weld 54 of the bladder assembly 40 during an RF welding operation. In particular, the tube-welding electrode 62 has a concave, arcuate surface 64 for forming a circumferential portion of the tube-weld 54 and opposite, planar lateral surfaces 66 for forming lateral portions of the tube-weld 54 on opposite sides of the circumferential portion 64. In the illustrated embodiment, dielectric elements 68 are attached to the planar lateral surfaces 66. These elements 68 may be used to "tune" the tube-welding electrode 62 so that the circumferential and lateral portions of the tube-weld 54 are formed more nearly at the same rate. For more information regarding the use of dielectric material to tune electrodes, reference may be made to co-assigned pending U.S. application Ser. No. 11/613,694, filed Dec. 20, 2006, Pub. No. US 2008/0149609, titled APPARATUS AND METHOD FOR MAKING BAG ASSEMBLY, and to co-assigned pending U.S. application Ser. No. 12/486, 467, filed Jun. 17, 2009, titled APPARATUS FOR MAKING BAG ASSEMBLY AND METHOD THEREOF. The ribbon electrode 58 and tube-welding electrode 62 are immovable relative to one another. In other embodiments, the two electrodes may be movable relative to one another, as disclosed for example in co-assigned pending U.S. application Ser. No. 11/613,694, filed Dec. 20, 2006, Pub. No. US 2008/0149609, titled APPARATUS AND METHOD FOR MAKING BAG ASSEMBLY.

As best illustrated in FIG. 6, insulating (non-conductive) layers 70 or dividers of dielectric material are positioned between the tube-welding electrode 62 and respective ends of the ribbon electrode 58 to electrically isolate the tube-welding electrode 62 from the ribbon electrode 58. By way of example, these layers 70 may be of a polyoxymethylene (e.g., Delrin®) polymer. Since the two electrodes 58, 62 are at the same potential, the insulating layers 70 may be relatively thin (e.g., 0.010-0.030 in. thick) to allow an RF weld to bridge the electrodes 58, 62 across the layers 70 while still maintaining electrical isolation between the electrodes 58, 62. In other words, the layers 70 are sufficiently thin that they do not interrupt the continuity of the tube-weld 54 and perimeter-weld 52.

Figure 12:
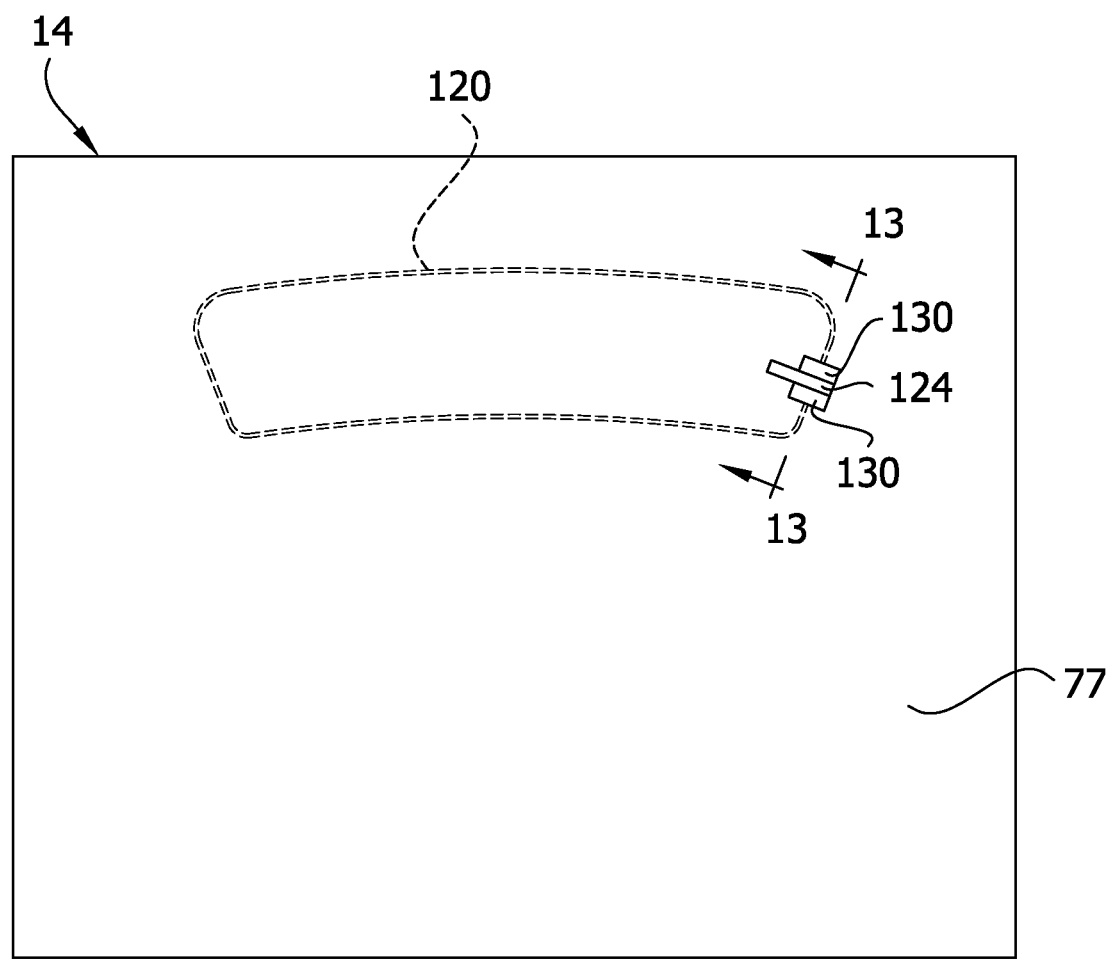
FIG. 12 is a view illustrating the second welding platen of the welding apparatus of FIG. 1.
Figure 13:
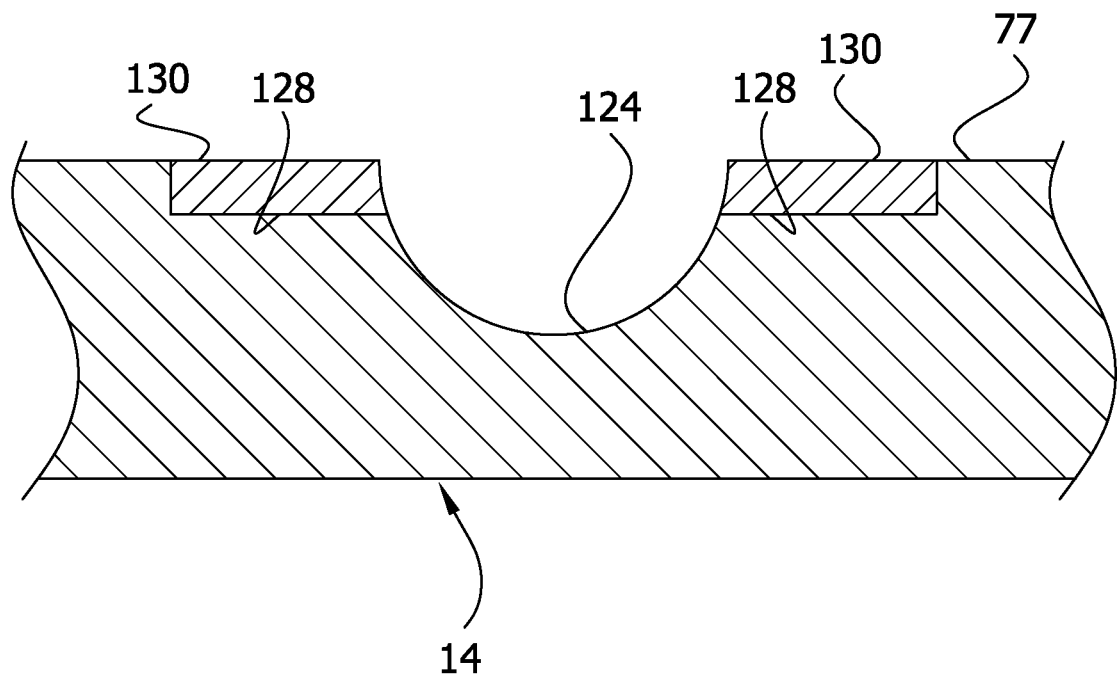
FIG. 13 is an enlarged section taken in the plane of 13-13 of FIG. 12.

In the illustrated embodiment, the lower welding platen 14 has a substantially planar, continuous surface 77 opposing the upper welding 8 platen 12 (see FIGS. 2, 12 and 13). The area of this surface 77 opposing the ribbon electrode 58 on the upper platen defines a perimeter-welding electrode 120 to complete the perimeter-weld 52 during a welding operation. As best illustrated in FIG. 13, the surface 77 is recessed to have a concave, arcuate surface 124 and opposite, planar lateral surfaces 128 complementary to the corresponding surfaces 64, 66 of the tube-welding block 62 on the upper welding platen 12 to complete the tube-weld 54 during a welding operation. Dielectric elements 130 are attached to the planar lateral surfaces 128, generally opposite the dielectric elements 68 on the upper tube-welding block 62. Alternatively, the lower welding platen 14 may have a perimeter-welding electrode and tube-welding electrode identical or substantially identical (a mirror image) to the perimeter-welding electrode 58 and tube-welding electrode 62 on the upper welding platen 12.

The electrodes of the welding apparatus may have other configurations depending on the product being welded, for example. The electrodes are formed from any electrically conductive material. By way of example, the electrodes may be constructed of brass or copper or aluminum or stainless steel or magnesium and/or may be copper-plated or brass-plated. Exemplary constructions are described in the aforementioned pending U.S. application Ser. No. 11/613,694, Pub. No. US 2008/0149609, and pending U.S. application Ser. No. 12/486,467, filed Jun. 17, 2009, titled APPARATUS FOR MAKING BAG ASSEMBLY AND METHOD THEREOF.

Referring to FIGS. 1, 2 and 6, the RF power distributing device 30 comprises separate first and second conductive plates 72, 76 positioned side-by-side and spaced apart by a gap 78. As will be described, the first conductive plate 72 is electrically connected to the first die member 20 and electrically isolated from the second die member 22. Similarly, the second conductive plate 76 is electrically connected to the second die member 22 and electrically isolated from the first die member 20.

The first conductive plate 72 is positioned at an elevation between the welding platen 12 and the first die member 20, and the second conductive plate 14 is positioned at an elevation between the welding platen 12 and the second die member 22. The plates 72, 76 are of different sizes. In the illustrated embodiment, the first plate 72 is larger than the second plate 76 and has a correspondingly larger surface area. Desirably, the plates 72, 76 have substantially the same thickness and are constructed of the same material. However, as will become apparent, the plates 72, 76 may have other configurations. A first dielectric layer 80 is disposed between the metal plate 12 and the first and second conductive plates 72, 76. A second electrically insulating layer 82 is disposed between the first and second conductive plates 72, 76 and respective first and second die members 20, 22.

Essentially, the metal plate 12 and first conductive plate 72, separated by the dielectric layer 80, function as the parallel plates of a first capacitor C1, and the metal plate 12 and second conductive plate 76, separated by the dielectric layer 80, function as the parallel plates of a second capacitor C2 in parallel with the first capacitor C1 (see FIG. 2). As a result, the RF power provided to the upper welding platen 12 is divided into the aforementioned different first and second power components, respectively. The different magnitudes of these power components can be selected by appropriately sizing the respective surface areas of the conductive plates 72, 76. In this regard, the relative surface areas of the two plates 72, 76 have a direct correlation with the relative magnitudes of the energy/power transmitted by the plates 72, 76, assuming all other characteristics of the plates 72, 76 are equal (e.g., material and dimensions). Thus, the amount of RF energy transferred to respective die members 20, 22 can be controlled by sizing each of the plates 72, 76 relative to one another. This can facilitate the welding process.

By way of example, the overall area of the perimeter weld 52 is typically larger than the overall area of the tube weld 54. As a result, if both the perimeter-weld electrode 58 and the tube-weld electrode 58 receive equal RF energy, the tube-weld 54 will be completed before the perimeter-weld 52. To compensate, more energy can be delivered to the perimeter-welding electrode 58 than to the tube-welding electrode 62, so the tube-weld and perimeter-weld are completed at substantially the same time. To achieve this, the conductive plate 72 associated with the first die member 20 is sized to deliver more power to the perimeter-welding electrode 58 via the first die member 20, and the conductive plate 76 associated with the second die member 22 is sized to deliver less power to the tube-welding electrode 62 via the second die member 22. By thus splitting the power into components of selected magnitudes, the RF energy can be delivered in a manner to complete the perimeter-weld 52 and tube-weld 54 substantially simultaneously so that the assembly 40 can be welded in one operation without over-welding or under-welding the assembly 40. Sizing the plates 72, 76 to achieve the selected magnitudes and obtain the desired results is sometimes referred to as a "tuning" process.

In the above description, the RF power distributing device 30 includes only two conductive plates 72 and 76, one for each die member 20 and 22 respectively. It will be understood, however, that the number the number of conductive plates may vary (e.g., two, three, etc.), depending on the number of die members requiring respective RF energy components. In general, one conductive plate is provided for each such die member. Each conductive plate is sized for providing the appropriate amount of energy to its respective die member.

The dielectric layer 80 between the upper welding platen 12 and the conductive plates 72, 76 comprises a relatively thin sheet of a suitable dielectric material such as nylon, a polyoxymethylene (e.g., Delrin®) polymer, phenolic resins such as Bakelite, or any other resin-based dielectric material having a suitable dielectric constant. The layer 80 has selected thickness to insure proper welding. In general, it is desirable that the dielectric layer 80 have a uniform thickness and be formed of a single dielectric material throughout all sections of the layer so that the capacitance of the capacitors C1, C2 formed by the conductive plates 72, 76 and the upper welding platen 12 depends largely on the relative surface areas of the plate 72, 76. This facilitates the die design process. However, it will be understood that the thickness and/or dielectric constant of the dielectric layer 80 may be selectively varied in different sections of the layer 80. For example, each section of layer 80 may comprise different dielectric materials to provide different dielectric constants. Any such variations will affect the division of energy from the RF source into the respective first and second power components.

The conductive plates 72, 76 are of a suitable metal such as brass or copper or aluminum or stainless steel or magnesium and/or may be copper-plated or brass-plated. The plates 72, 76 may have any shape as long as the correct ratio of power between the die components 20, 22 (e.g., the first and second die members) takes place. In general, it is advantageous (but not essential) to position the first conductor plate 72 directly over the first die member 20 and the second conductor plate 76 directly over the second die member 22.

The insulating layer 82 between the conductive plates 72, 76 and the first and second die members 20, 22 comprises a sheet of a suitable dielectric material such as nylon, a polyoxymethylene (e.g., Delrin®) polymer, phenolic resins such as Bakelite, or any other resin-based dielectric material having a suitable dielectric constant. The layer 82 has selected thickness such that it functions to electrically isolate each die member from the conductive plate or plates associated with the other die member or members. This isolation provides flexibility in the design of the conductive plates 72, 76 because the location, shape and/or size of either of the plates need not conform to design of either of the die members 20, 22. By way of example, the insulating layer 82 allows different portions of the same conductive plate to overlap different die members 20, 22 without loss of the power splitting capability of the plate. This is beneficial because it allows greater design flexibility.

In some situations, it may be possible to eliminate the insulating layer 82 entirely. For example, if each conductive plate 72, 76 directly overlies a respective die member 20, 22, and each die member is electrically isolated from each other die member and each other conductive plate, then there may be no need for the insulating layer 82.

Figure 7:
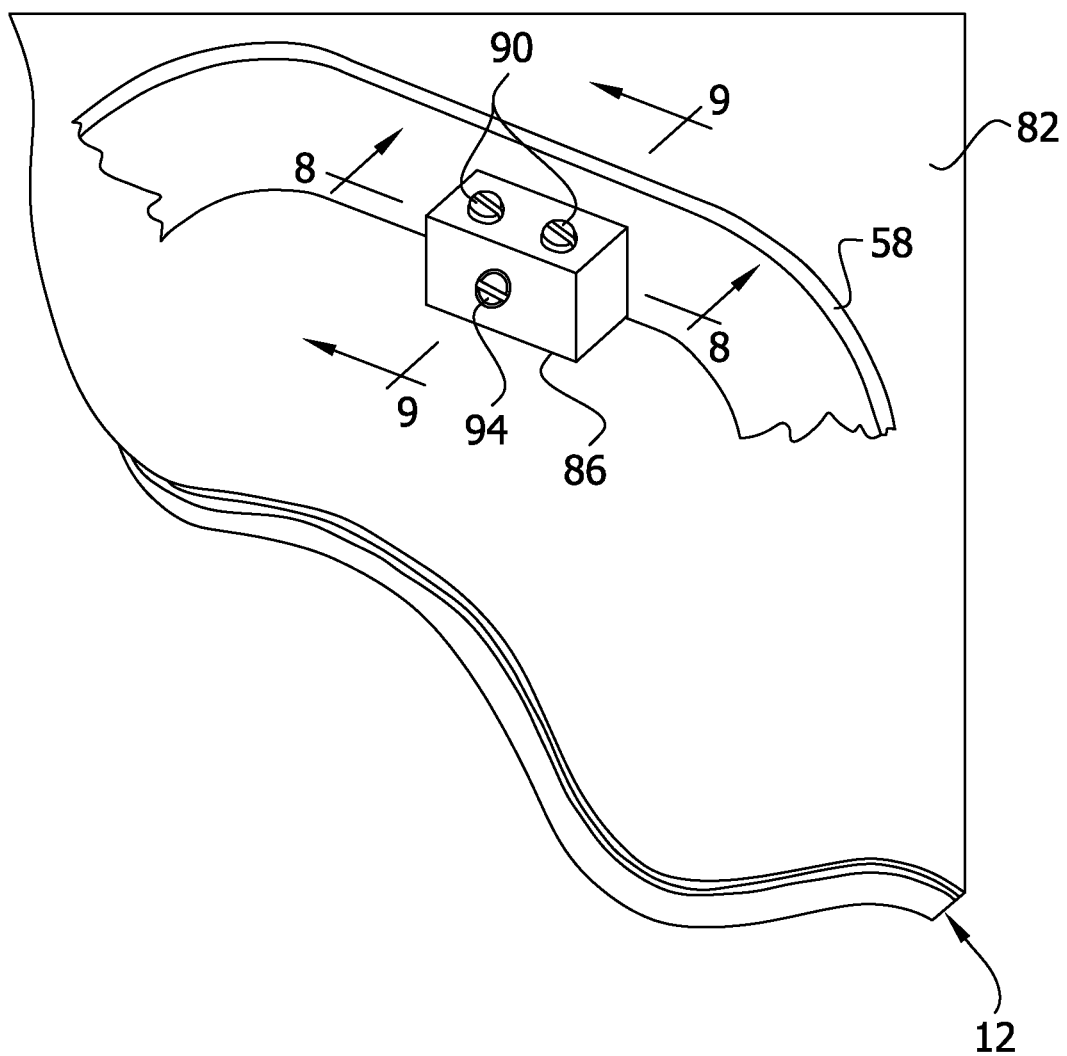
FIG. 7 is a schematic view illustrating one way to secure the first die member to the first welding platen.
Figure 8:
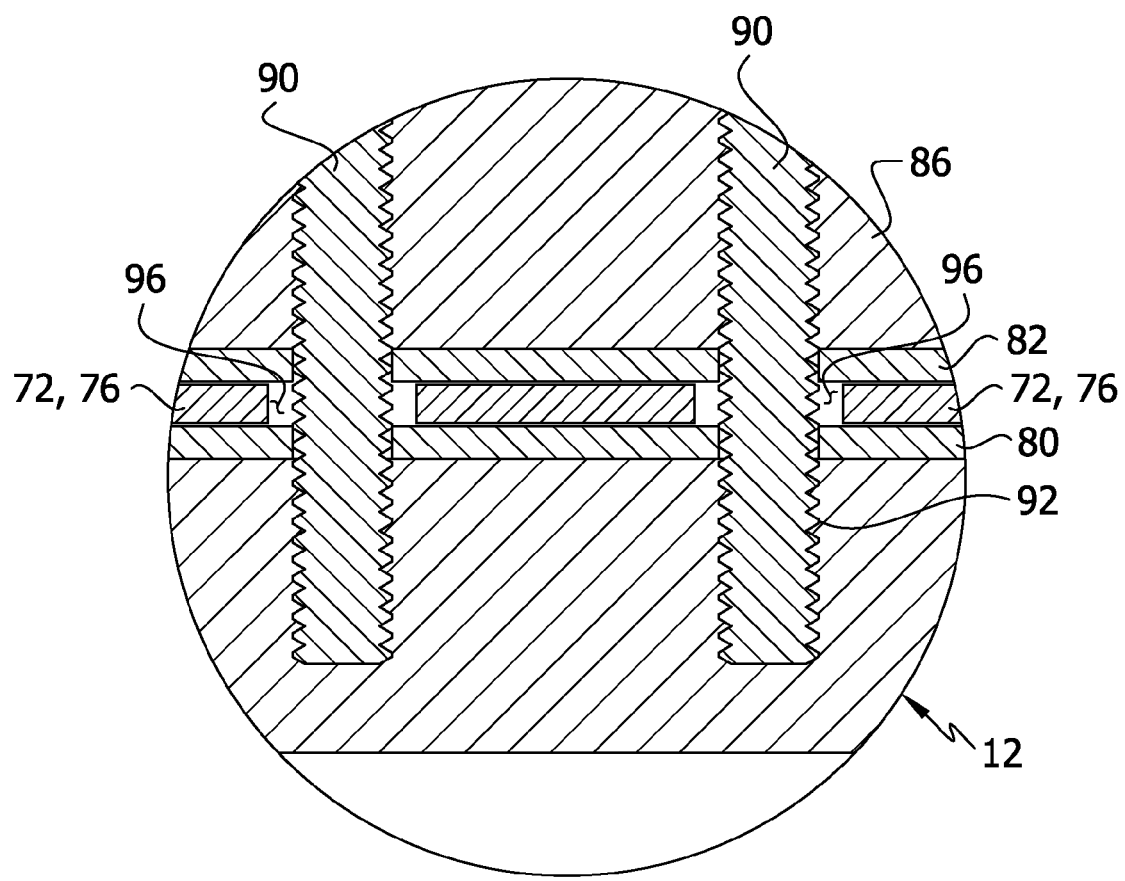
FIG. 8 is an enlarged section taken in the plane of 8-8 of FIG. 7.
Figure 9:
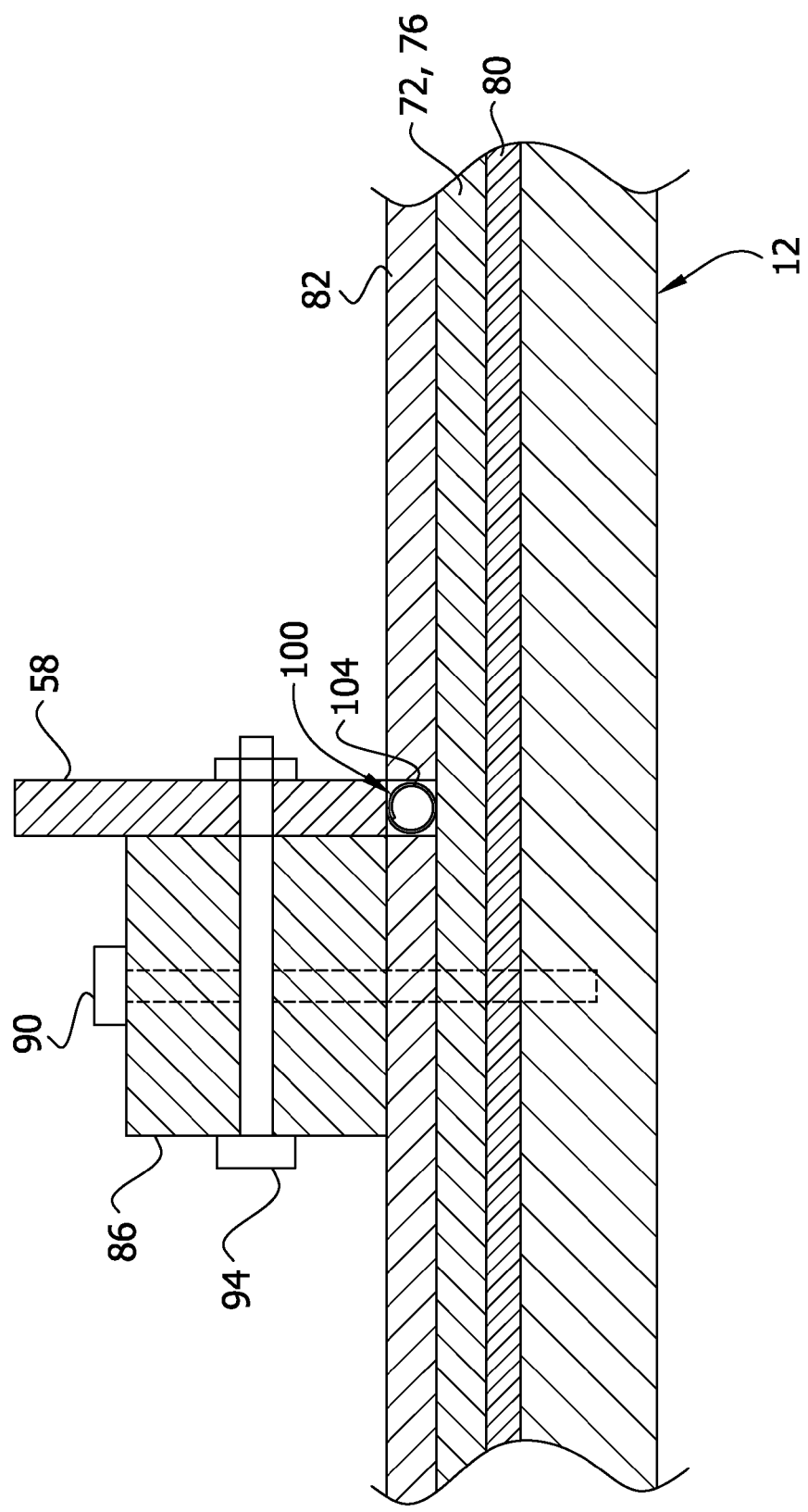
FIG. 9 is an enlarged section taken in the plane of 9-9 of FIG. 7.

The ribbon electrode 58 is secured to the welding platen 12 by one or more mounting blocks 86, each of which is attached to the welding platen 12 by a first set of one or more threaded fasteners 90 (see FIGS. 7-9). The fasteners 90 extend through openings in the insulating layer 82, respective conductive plate 72 or 76, and dielectric layer 80 into threaded holes 92 in the welding platen 12. The openings 96 in the conductive plate 72, 76 should be sufficiently large to prevent arcing. A second set of one or more fasteners 94 secures the ribbon electrode 58 to the mounting block 86. The mounting block 86 and fasteners 90, 94 are of a suitable dielectric material. By way of example, the mounting block 86 may be of a polyoxymethylene (e.g., Delrin®) polymer and the fasteners 90, 94 may be of nylon. The ribbon electrode 58 can be secured to the welding platen 12 in other ways.

Figure 10:
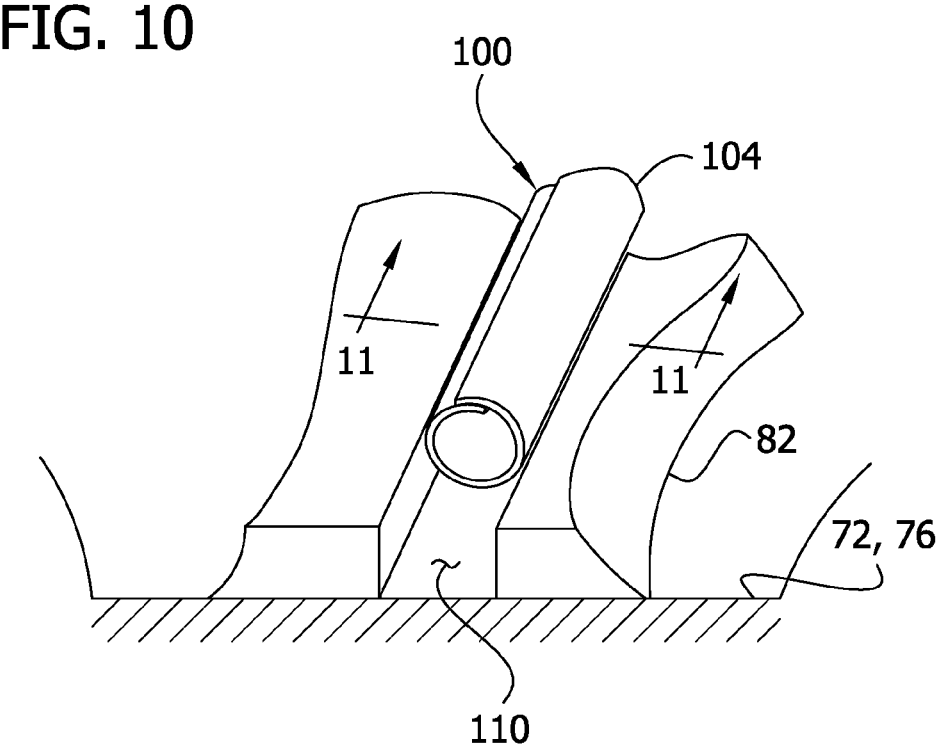
FIG. 10 is a perspective illustrating an electrical contact member for making an electrical connection between components of the apparatus.
Figure 11:
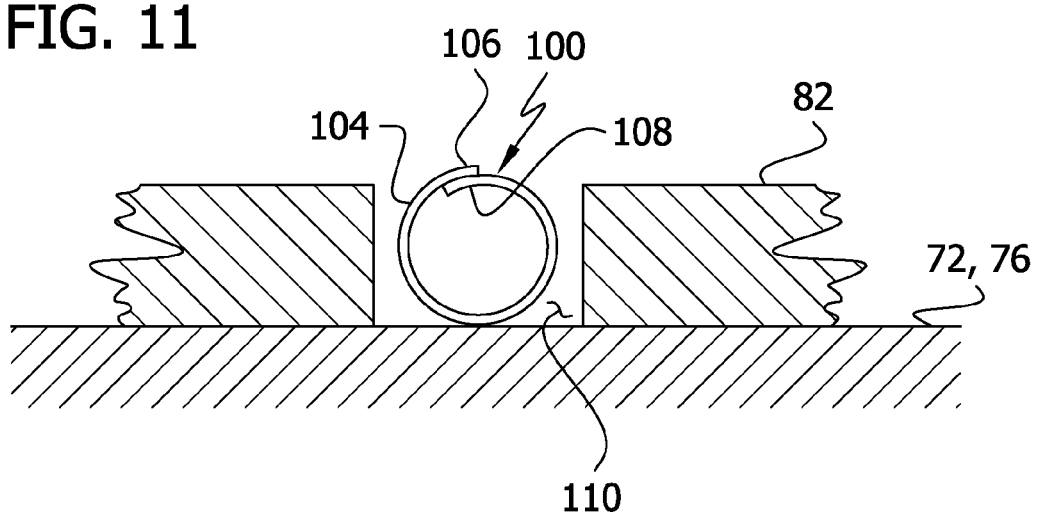
FIG. 11 is a section taken in the plane of 11-11 of FIG. 10.

The first and second die members 20, 22 are electrically connected to respective conductor plates 72, 76 by multiple electrical connections 100. As illustrated in FIGS. 9-11, each connection 100 comprises a deformable contact member 104 (e.g., a resiliently deformable member) formed as an elongate roll of conductive metal, such as beryllium, having overlapping edge margins 106, 108 free to move relative to one another. The contact member 104 is positioned in an opening 110 in the insulating layer 82 sized for snugly receiving the member 100. The contact member 104 has a diametric dimension greater than the thickness of the insulating layer 82 (e.g., 20-30% greater) and bears directly against a respective conductive plate 72, 76 and a respective die member (not shown) for conducting RF current from the plate to the die member. In one exemplary embodiment, the contact member 104 has an outer diameter of about 0.125 in. and a length of about 0.50 in. As the fasteners 90 through the mounting blocks 86 are tightened, the contact member 104 deforms to provide an effective electrical path. In the illustrated embodiment, the deformation comprises a resilient flattening of the contact member 104 and/or a sliding movement of the overlapping edge margins 106, 108 relative to one another (effectively winding the coil of the roll tighter).

Other connectors may be used for connecting the conductive plates 72, 76 to respective die members 20, 22. For example, the type of electrical connection described above may not be feasible in a situation where a conductive plate does not overlie the die member to which it is transferring energy/power. In this situation, the conductive plate may be connected to its respective die member by a cable or other connection which extends from the conductive plate to its respective die member around a peripheral edge of the insulating layer.

Additional layers of dielectric material of selected thickness and/or dielectric constant can be used on the die members 20, 22 to ensure proper welding, as described in aforementioned pending U.S. application Ser. No. 11/613,694, Pub. No. US 2008/0149609, and pending U.S. application Ser. No. 12/486,467, filed Jun. 17, 2009, titled APPARATUS FOR MAKING BAG ASSEMBLY AND METHOD THEREOF. By way of example, a layer of dielectric material may be secured along the outer edge of the perimeter-welding ribbon electrode, and a layer of dielectric material may be secured to the lateral welding surfaces of the tube-welding electrode.

The apparatus 10 can be used to carry out a welding operation in the following manner. The bladder sub-assembly is placed in position on the lower welding platen 14 and the press device 26 is operated to move the upper welding platen 12 to a welding position in which the sub-assembly is compressed by the first and second die members 20, 22. The RF generator 16 is then operated to deliver radiofrequency current to the conductive plates 72, 76 which capacitively split the current (power) into respective first and second RF power components of different magnitudes. The first power component is delivered to the first die member 20, and the second power component is delivered simultaneously to the second die component 22. The radiofrequency current creates an electric field modulated in the radiofrequency range between the two perimeter-welding electrodes (defined by the first upper die member 20 and the opposing perimeter-welding electrode, whatever configuration it may have) and the two tube-welding electrodes (defined by the second upper die member 22 and the opposing tube-welding electrode, whatever configuration it may have). The radiofrequency field heats the polymeric sheets 50 and the tube 42 disposed between the electrodes, thus forming the perimeter-weld 52 and tube weld 54. The amount of RF energy delivered to the die components 20, 22 is divided such that the perimeter-weld 52 and tube weld 54 are formed simultaneously. Desirably, the welds 52, 54 may also be completed simultaneously or substantially simultaneously so that the welding can take place in one welding operation. After the welding is complete, the press device 26 is operated to separate the two welding platens 12 and 14, and the now completed assembly 40 is removed.

It is understood that substantially the entire welding process may be automated using the microcontroller 32. For example, the microcontroller 32 may be programmed to automatically move the upper welding platen 12 to its welding position; adjust the output of the radiofrequency generator 16 according to the desired power needs; supply the RF power for a predetermined period of time sufficient to complete the welding; and raise the upper welding platen 12 back to its raised position. Other ways of automating the welding apparatus 10 are within the scope of this invention.

The welding apparatus and methods described above are not limited to welding bag (e.g., bladder) assemblies. This invention can be applied to any RF welding application requiring different levels (amounts) of radio-frequency energy to be delivered to an unlimited number of RF welding die members.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. Radiofrequency welding apparatus comprising:
a first welding platen;
a second welding platen;
a single source providing radiofrequency power to the first welding platen;
a first die member mounted on said first welding platen;
a second die member mounted on said first welding platen adjacent the first die member, the first and second die members being electrically isolated; and
a radiofrequency power distributing device for capacitively splitting the radiofrequency power provided to said first welding platen into first and second radiofrequency power components of different magnitudes and for simultaneously delivering said RF power components to said first and second die members, respectively, the radiofrequency power distributing device comprising separate first and second electrically isolated conductive plates of different sizes, said first conductive plate being positioned at an elevation between the first welding platen and the first die member and said second conductive plate being positioned at an elevation between the first welding platen and the second die member, the first conductive plate being electrically connected to the first die member and electrically isolated from the second die member, and the second conductive plate being electrically connected to the second die member and electrically isolated from the first die member, a dielectric layer between the first welding platen and the first and second conductive plates and an electrical insulating layer extending between the first conductive plate and first die member and between the second conductive plate and the second die member.

2. Radiofrequency welding apparatus as set forth in claim 1 wherein said first and second conductive plates are positioned generally side-by-side directly over respective first and second die members.

3. Radiofrequency welding apparatus as set forth in claim 2 further comprising multiple electrical contacts between said first conductive plate and said first die member and multiple electrical contacts between said second conductive plate and said second die member.

4. Radiofrequency welding apparatus as set forth in claim 3 wherein each of said electrical contacts comprises a contact member in an opening in said electrical insulating layer.

5. Radiofrequency welding apparatus as set forth in claim 1 wherein said first and second conductive plates are of the same material and have substantially the same thickness.

6. Radiofrequency welding apparatus as set forth in claim 1 wherein said first and second die members are electrically isolated by an electrically non-conductive divider configured to allow a radiofrequency weld to bridge the first and second die members across the divider.

7. Radiofrequency welding apparatus as set forth in claim 1 wherein said first and second die members are immovable relative to one another when mounted on the first welding platen.

8. Radiofrequency welding apparatus as set forth in claim 1 wherein said first die and second members are configured for radiofrequency welding opposed sheets and a tube at least partially received between the sheets.

9. Radiofrequency welding apparatus as set forth in claim 8 wherein said first die member is configured for heating the sheets along a path to weld the sheets together at a perimeter-weld, and the second die member is configured for heating the sheets and tube along a path to weld the tube to the sheets at a tube-weld.

10. Radiofrequency welding apparatus as set forth in claim 9 wherein the first radiofrequency power component delivered to the first die member has a magnitude greater than the magnitude of the second radiofrequency power component delivered to the second die member.

11. Radiofrequency welding apparatus comprising:
a first welding platen;
a second welding platen;
a single source providing radiofrequency power to the first welding platen;
a first die member mounted on said first welding platen;
a second die member mounted on said first welding platen adjacent the first die member, the first and second die members being electrically isolated; and
a radiofrequency power distributing device for capacitively splitting the radiofrequency power provided to said first welding platen into first and second radiofrequency power components of different magnitudes and for simultaneously delivering said RF power components to said first and second die members, respectively, the radiofrequency power distributing device comprising separate first and second electrically isolated conductive plates and an electrical insulating layer extending between the first conductive plate and first die member and between the second conductive plate and the second die member.

12. Radiofrequency welding apparatus as set forth in claim 11 wherein said first and second conductive plates have different sizes.

13. Radiofrequency welding apparatus as set forth in claim 12 wherein said first conductive plate is positioned at an elevation between the first welding platen and the first die member and said second conductive plate being positioned at an elevation between the first welding platen and the second die member, the first conductive plate being electrically connected to the first die member and electrically isolated from the second die member, and the second conductive plate being electrically connected to the second die member and electrically isolated from the first die member.

* * * * *